H. P. BRUEGGEMANN 3,397,605

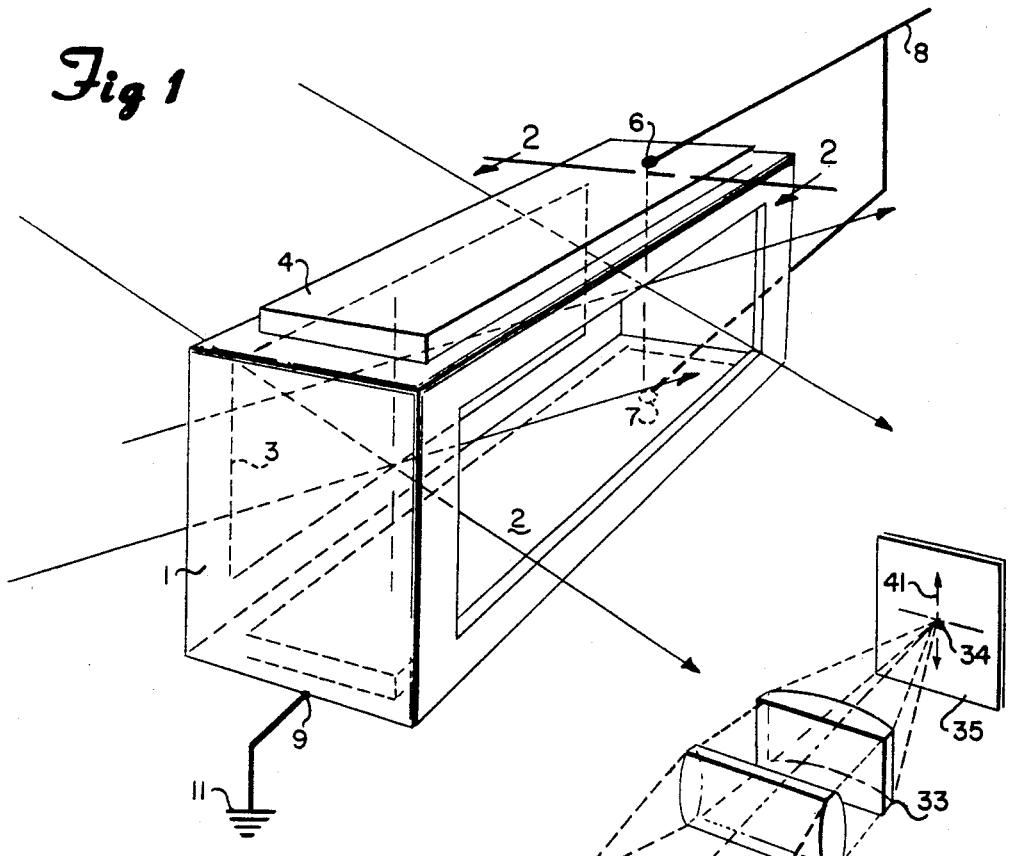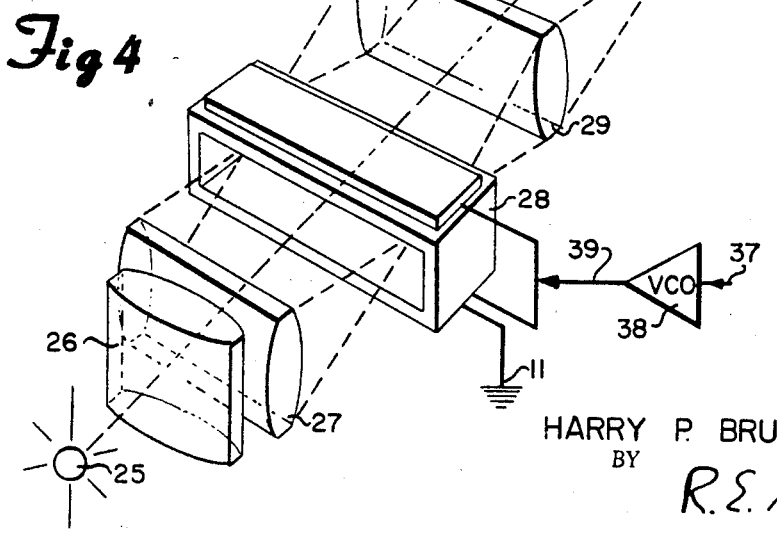

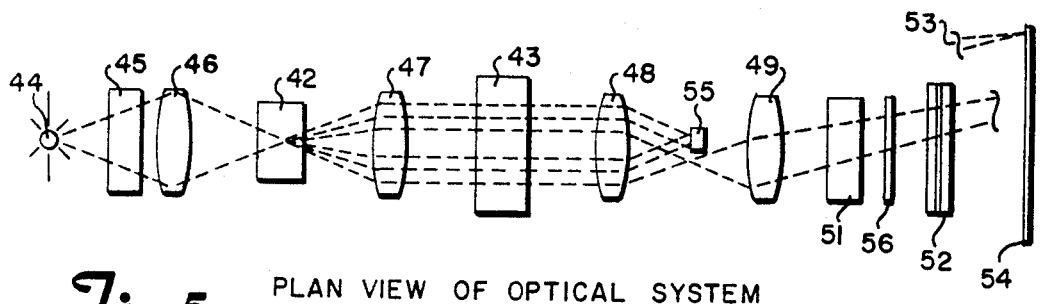
Fig 5 PLAN VIEW OF OPTICAL SYSTEM
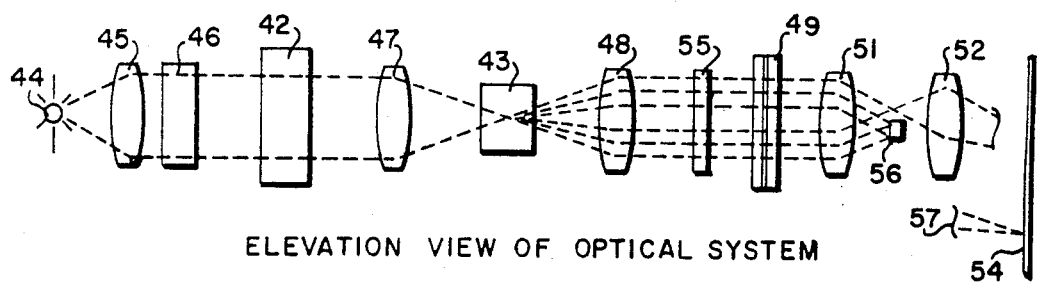
ELEVATION VIEW OF OPTICAL SYSTEM
Fig 6
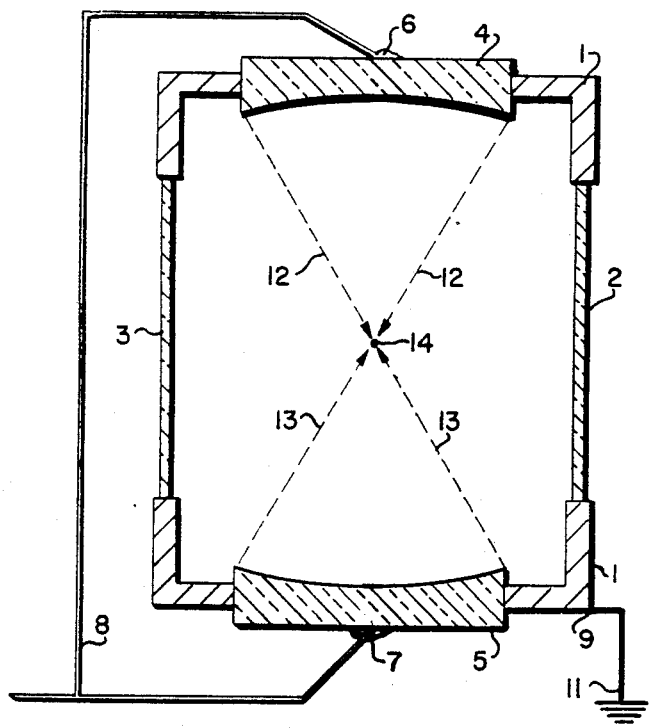
Fig 2
HARRY P. BRUEGGEMANN
INVENTOR.
BY *R. E. Geauque*
ATTORNEY Aug. 20, 1968

FREQUENCY MODULATED RADIANT ENERGY SCANNER EMPLOYING
CAVITATION-INDUCED DIFFRACTION

Filed Jan. 22, 1964

INVENTOR.
HARRY P. BRUEGGEMANN
BY
R. E. Geauque
ATTORNEY

United States Patent Office 3,397,605
Patented Aug. 20, 1968

3,397,605
FREQUENCY MODULATED RADIANT ENERGY SCANNER EMPLOYING CAVITATION INDUCED DIFFRACTION
Harry P. Brueggemann, San Marino, Calif., assignor to The Marquardt Corporation, Van Nuys, Calif., a corporation of California
Filed Jan. 22, 1964, Ser. No. 339,521
9 Claims. (Cl. 88—1)

ABSTRACT OF THE DISCLOSURE

A light scanning device is described which responds to a frequency-modulated input signal to produce a corresponding angular diffraction of a light beam passed through the device. Diffraction of the light beam is produced by means of a bubble screen in a transparent liquid placed in the beam's path. Frequency-modulated ultrasonic energy, propagated into the liquid, induces cavitation and thereby produces the bubbles forming the diffraction screen.

---

This invention relates to apparatus for changing the direction of propagation of a beam of radiant energy in response to a varying electrical input signal, and more particularly to radiant energy scanning apparatus in which controllable diffraction is obtained by means of cavitation induced within an ultrasonic cell.

There are a number of instances in which it is desirable to diffract a beam of radiant energy by a given amount. The diffraction of light, for example, is the basis for a number of measuring and/or display devices.

Large-screen real-time image displays, as generally constructed heretofore, necessitate the sweeping of a beam of high-intensity light across the display screen, while suitably modulating the intensity of the beam. Practical limitations in the state-of-the-art preclude the use of cathode ray tube displays for brilliant large-screen displays. To overcome these limitations, various mechanical means have been employed to sweep a beam of intensity-modulated light across a viewing screen. These devices have generally been based upon the use of rotating prisms and/or mirrors driven at high speeds. Due to the relative complexity of the devices of this type, their relatively slow speed, and their attendant operating and maintenance problems, large-screen image display devices based upon mechanical scanning principles have failed to achieve commercial acceptance. The apparatus of the present invention overcomes the deterrents to commercial success of prior devices. In particular, as applied to the positional control of a beam of light, the present invention does not employ moving parts, in the ordinary sense of the word, since the diffraction of the light beam produced by the apparatus of the invention, in order to achieve the desired scanning action, is obtained by means of controlled cavitation within an ultrasonic light cell. This scanning technique is especially suited for use with the light intensity modulator disclosed in copending application Serial No. 324,045, filed Nov. 15, 1963 and of common assignee.

The ultrasonic light cell of the present invention effectively establishes a diffraction screen which diffracts light passing therethrough. The diffraction screen comprises a pattern of cavitation-induced bubbles within the liquid of the cell. The spacing of the bubbles depends upon the frequency of the ultrasonic energy propagated in the liquid, and the angle through which the light rays are diffracted depends upon the spacing of the bubbles and, therefore, upon the frequency of the ultrasonic energy in the liquid. Therefore, by changing the frequency of the ultrasonic energy in a controlled manner, light can be "bent" through an angle in a controlled manner. Inasmuch as the only moving elements in the apparatus comprise the driving piezoelectric transducers and the liquid within the cell, complex, macroscopic mechanical scanning mechanisms are obviated.

In a typical construction, cavitation is effected by means of a pair of piezoelectric transducers contiguous with opposing longitudinal walls of the cell. The cell is transparent to radiant energy in a direction transverse to the path of the scanning beam.

In the operation of the scanning device, lines of extremely small bubbles are formed by cavitation induced in the liquid filling the cell. Energy supplied to the piezoelectric transducers will cause the necessary cavitation of liquid contained within the cell and thereby result in diffraction of the beam path. That is, the beam of radiant energy entering the cell will be diffracted through an angle which is dependent upon the wavelengths of the energizing ultrasonic signal and the radiant energy from the source.

The apparatus is particularly useful as a means to achieve vertical scanning in a projection television system of the type employing a horizontally deflected single-line source. Another application of the apparatus is in high-speed data display systems in which symbols, characters, maps and random shapes are displayed in real-time. Positional accuracy of the data displayed in such a system may be maintained to an unusually high accuracy, typically of the order of 0.1%. The accuracy of angular deviation is proportional to the frequency stability of the ultrasonic generator used in excite the cell, and stability of ±0.1% is readily obtainable in a practical construction.

The frequency which is used to drive the piezoelectric transducers for exciting the cell is preferably derived from a voltage controlled oscillator (VCO). The VCO can be readily stabilized to 0.1% of any desired frequency over a large range of frequencies, and therefore the angle through which the light is diffracted can be made stable to 0.1% over a large range of angles.

The diffraction angles achievable with the present invention, though highly accurate, are relatively small, being typically of the order of 0.8° of arc in an ultrasonic cell using water at a temperature of 74° C., excited at 20 megacycles per second or 4.0° at 100 megacycles. While many conventional light sources lack sufficient brightness to effectively utilize such small angles, the recent development of extremely brilliant light sources such as lasers, makes it possible to fill a 10' x 10' screen with data that can be easily seen in a normally lighted room.

Ultrasonic light cells have been suggested heretofore as a means for modulating the intensity of light; however, it is believed that devices of this general type have not been employed heretofore to modulate the diffraction angle of a beam of light, particularly by means of ultrasonically induced cavitation.

It is therefore a principal object of the invention to provide novel and improved means for controlling the direction of a beam of radiant energy.

Another object of the invention is to provide novel and improved means for scanning by means of a beam of radiant energy.

Still another object of the invention is to provide novel and improved ultrasonic light cell scanning apparatus, Yet another object of the invention is to provide light scanning apparatus employing cavitation phenomena to control diffraction of light passing therethrough.

It is another object of the invention to provide a novel and improved light cell scanning means which employs a plurality of lines of bubbles to cause diffraction of a light beam passing therethrough.

An object of the invention is to provide a novel and improved apparatus useful in generating and displaying characters.

Still another object of the invention is to provide means for employing ultrasonic energy to modulate the angle of diffraction of a beam of radiant energy in order to selectively control the instantaneous position of the beam.

Another object of the invention is the improvement of scanning apparatus, generally.

A general object of the invention is to provide novel and improved radiant energy scanning apparatus which overcomes disadvantages of previous means and methods heretofore intended to accomplish generally similar purposes.

Many other advantages, features and additional objects of the present invention will become manifest to those versed in the art upon making reference to the detailed description and the accompanying sheets of drawings in which a preferred structural embodiment, incorporating the principles of the present invention is shown by way of the illustrative example.

FIGURE 1 is a somewhat diagrammatic perspective view of an ultrasonic light cell scanning device according to the invention.

FIGURE 2 is a transverse sectional view taken along line 2—2 of FIGURE 1.

Figure 3A:
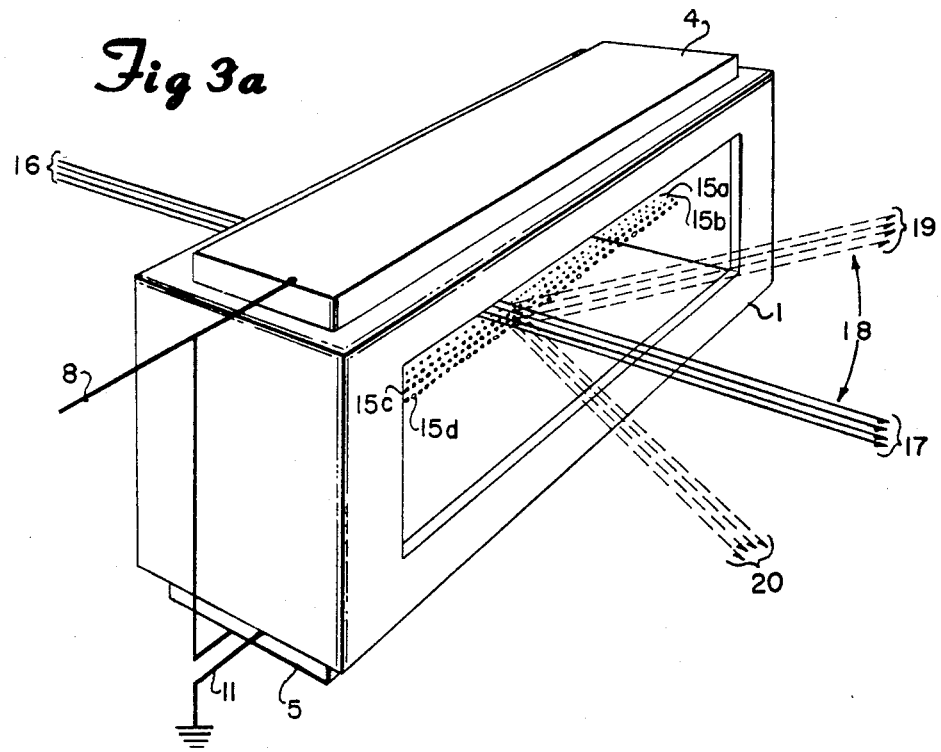
FIGURE 3a is a diagrammatic illustration of a scanning cell, according to the invention, in which wide spacing between bubble lines is achieved in response to a low input frequency.

FIGURE 4 diagrammatically illustrates a vertical scanning system according to the invention.

FIGURE 5 is a plan view of an orthogonal scanning system incorporating a pair of scanning devices of the invention.

FIGURE 6 is an elevation view of the apparatus of FIGURE 5.

In a typical construction of display system utilizing the scanning device of the invention, the apparatus receives modulated light in the form of a line beam and further modulates it in the quadrature plane, so as to provide for XY or two-dimensional projection. Looking now at FIGURE 1, the cell apparatus comprises a liquid-enclosing container 1 having a pair of coplanar transparent windows 2 and 3 on opposite walls thereof. The container 1 is filled with a transparent liquid such as water through which ultrasonic energy may be propagated from appropriate transducer means. The transducer means may comprise first and second piezoelectric crystals 4 and 5 located in opposition to each other in the top and bottom walls of the container 1. Piezoelectric crystals 4 and 5 may be suitably shaped as shown in FIGURE 2 in order to focus the generated ultrasonic sound along a line 14 substantially coextensive with the longitudinal axis of the container. In FIGURE 2, the inwardly facing surfaces of the piezoelectric crystals 4 and 5 are concave. The top and bottom faces of each of the two crystals (4 and 5) are each provided with an energizing electrode which may comprise deposited metal film or the like. One electrode of each pair may be grounded to the container 1 and the opposite electrode of each crystal is provided with an energizing terminal connection. For example, the electrode for crystal 4 is provided with terminal 6 and the electrode for crystal 5 is provided with terminal 7. Terminals 6 and 7 are connected in common to conductor 8.

Figure 3B:
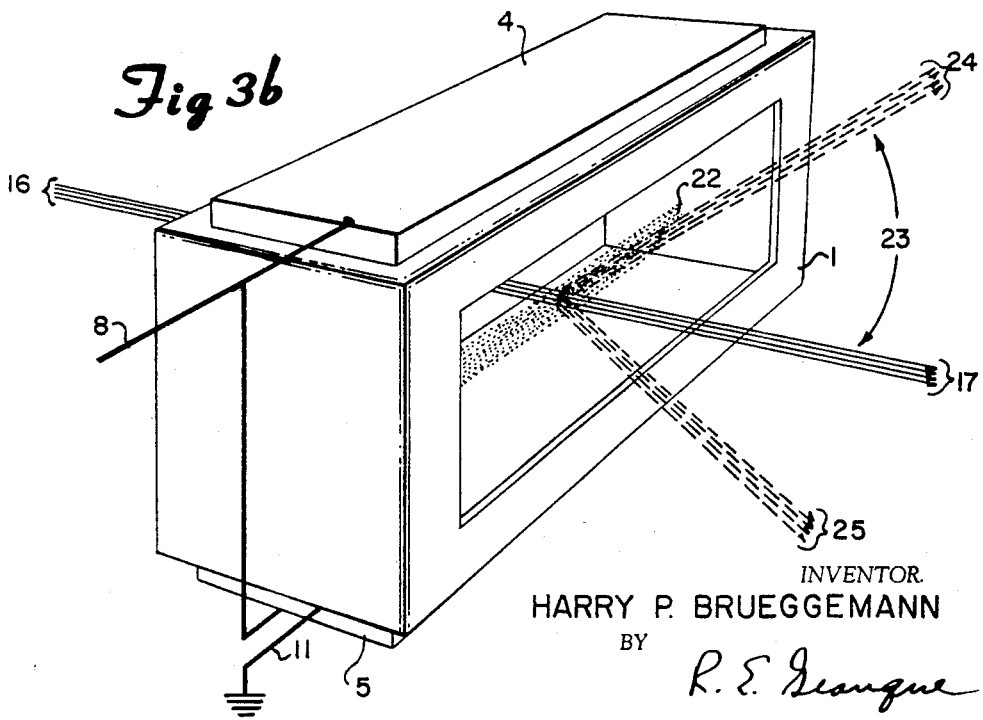
FIGURE 3b is a diagrammatic illustration in which narrow spacing between bubble lines is achieved in response to a high input frequency.

With further reference to FIGURE 2, the concave surface of transducer 4 focuses the acoustical energy propagated therefrom in a direction indicated by lines 12; similarly, the concave surface of transducer 5 focuses its acoustic output in a direction indicated by lines 13. The combined acoustic outputs from transducers 4 and 5 will establish a standing wave pattern along a line 14 corresponding to the light focus line, extending along the longitudinal axis of the device. The focusing of the acoustic energy concentrates the ultrasound at the light focus line 14 by means of the ancillary optical system described hereinafter in connection with FIGURE 4. The standing sound wave created by the opposed transducers 4 and 5 generate stationary regions of high-pressure oscillations in the liquid one-half wavelength apart with regions between of no pressure oscillations. This line 14 has some finite dimension in the vertical plane, but this dimension is only a few sonic wavelengths. For example, at a frequency of 30 megacycles this line would be approximately 0.003 inch wide, measured in a vertical plane. Cavitation occurs in the high-pressure regions, creating a thin, planar, diffraction pattern. This pattern essentially comprises a few lines of bubbles, one stacked above the other, and extending along the longitudinal axis of container 1. In FIGURES 3a and 3b the spacing of these lines has been greatly exaggerated in order that the lines could be discerned at the scale of the drawing. In a practical case, the vertical distance between lines 15a and 15b is of the order of 0.003 inch. From a practical standpoint it is desirable to focus the acoustical energy to as fine a line as possible, since the diffraction spreading of the focus will automatically give the line an appreciable dimension. The lines of bubbles 15a to 15d in FIGURE 3a, determine the diffraction angle of the light because of the spacing between them. The spacing in turn is a function of the frequency of the acoustical energy present in the region. In order to change this spacing, the acoustical energy present must be allowed to drift out of the area, to be replaced by new acoustical energy of different frequency. The drift out and replacement occurs during a time determined by the distance between lines 15a and 15d divided by the speed of sound in water. Assuming the 15a–15d spacing is 0.004 inch, and the speed of sound in water is 60,000 inches per second, the time taken for this drift-out/replacement to occur in 0.004 divided by 60,000 or $67 \times 10^{-9}$ seconds (67 nanoseconds). This drift-out/replacement will be referred to hereinafter as "crossover time." There is no requirement for maintaining the bubbles over a long period of time; in fact, it is desirable that the bubbles disappear after each ultrasonic wave half-cycle.

The resonant frequency of the cavitation bubbles is chosen to be just below twice the maximum ultrasonic frequency so that the bubbles from one cycle will collapse just before the bubbles from the next cycle begin to form. If the ultrasonic frequency is 30 megacycles, the frequency crossover time due to cavitation will be about 17 nanoseconds.

It is relatively difficult to induce cavitation in pure water under conditions of high intensity sound. This is due primarily to the surface tension of the water which can sustain very large negative pressures within the body of the liquid. This internal cohesive force can be overcome by dispersing microscopic nuclei such as polystyrene spheres of 0.1 micron diameter, throughout the liquid. These nuclei must be smaller than the wavelength of light, otherwise, they themselves will scatter light and reduce the contrast on the screen. The water within the cell may also be charged with gas, such as carbon dioxide, which has a high vapor pressure at the operating temperature of the cell. This gas will diffuse into each bubble as it starts to grow from its nucleus, reinforcing its growth rate. Also a suitable agent may be added to the water to reduce its surface tension without wetting the polystyrene spheres (nuclei).

There is shown in FIGURE 3a a vertical scan cell according to the invention with a low-frequency drive signal applied to the piezoelectric transducers 4 and 5. As can be seen, there is a relatively wide spacing between the bubbles 15a–15d in FIGURE 3a as compared with FIGURE 3b. Light rays 16 focused in a line at the central axis of the cell will emerge as undiffracted rays, as indicated at 17, in the absence of an input signal on conductor 8. The application of a vertical scan signal on conductor 8 will cause a portion of the light rays 16 to be diffracted through a diffraction angle 18 to the upward position 19 and also downwardly to position 20.

Looking now at FIGURE 3b, there is shown the apparatus of FIGURE 3a with a higher-frequency vertical scan signal applied to the piezoelectric transducers 4 and 5. In this instance, there is a relatively narrow spacing between the bubble lines 22a–22i (as compared with FIGURE 3a and as a consequent increase in the diffraction angle 23. The diffracted rays are indicated at 24 and 25.

Looking now at FIGURE 4, there is shown the principal elements of a vertical scan system incorporating the apparatus of the invention together with ancillary optical elements which may be used to illuminate the cell and project a vertical line scan therefrom. Light from any suitable source 25 passes through cylindrical lens 26, which collimates the light in the horizontal plane. This lens has no power in elevation. The light from lens 26 then passes through cylindrical lens 27, which images the light in a horizontal line at the center of the cell (indicated generally at 28), in the plane of the concentrated ultrasound. Lens 27 has no power in the plan view. Light passing through the cell 28 next passes through cylindrical lens 29, which focuses the undiffracted light on opaque bar 31. This lens 29 has no power in the plan view. If there is no signal on line 37, no light will pass bar 31. If there is a signal on line 37, the first order diffracted light on one side of bar 31 is focused in the elevation plane on screen 35 by lens 32. The first order diffracted light on the other side, and all other orders, are blocked by bar 31. The light passing through lens 32 next passes through cylindrical lens 33 which focuses the light as a point 34 onto screen 35. Lens 32 has no power in the plan view. The centerline of the optical system is indicated at 36.

A control signal applied to the input 37 of VCO 38 will cause a selected-frequency excitation signal to be applied to transducers 4 and 5, via line 39. Cavitation within cell 28, in response to the applied excitation signal on line 39, will cause the horizontal point 34 to be displaced vertically, as indicated by arrow 41.

The optical image focused on the central plane of the cell 28 is not a mathematical line, but has some thickness because of the optical limitation (Rayleigh's Limit). A typical optical system according to the present invention may have a speed of $f/1.0$; therefore, the thickness of the light focus line will approach 32 millionths of an inch, and the frequency crossover time due to this source will be about 0.5 nanosecond.

A typical application of the apparatus of the present invention is for large-screen, high-speed character writing with high positional accuracy. To accomplish character writing, two cells, constructed in accordance with the present invention, are oriented at right angles to each other, each controlling the angle of diffraction in its own coordinate. Such an arrangement is shown in FIGURES 5 and 6. The light diffracted by these orthogonal cells will be focused to a point on the display screen. A change in the diffraction angle of either or both cells will then cause the point to move on the screen. Unlike conventional character writing systems employing cathode ray tubes in which amplitude modulation of the deflection system is employed, the present system uses essentially frequency modulation on the ultrasonic cells. The portion of the character writing system preceding the modulation interface is essentially the same as may be found in conventional and well-known character generating systems and may, for example, be of the type described in Patent No. 3,047,851 of common assignee herewith.

Since the position of the spot on the display screen is a function of the frequency in the ultrasonic cell, positional accuracy is dependent upon frequency accuracy. As is well known to those versed in the art, frequency can readily be controlled to extremly high accuracy.

The optical system in FIGURES 5 and 6 illustrates the manner in which the light beam is diffracted in two coordinates by ultrasonic cells 42 and 43 oriented at 90° to each other. Horizontal sweep of the light spot is controlled by cell 42 and vertical sweep is controlled by cell 43. FIGURE 5 is a plan view, and FIGURE 6 is an elevation view of the system. The two views show how cells 42 and 43 act independently on the light rays, each without interfering with the action of the other. Lenses 45, 46, 49, 51, and 52 are cylindrical lenses, having power in one plane only and no power in the other. The optical system is designed so that lenses 47 and 48 can be spherical lenses, that is, they have equal power in both planes. In FIGURE 5, lenses 46, 47, 48, and 49 have power and lenses 45, 51, and 52 have no power. In FIGURE 6, lenses 45, 47, 48, 51, and 52 have power and lenses 46 and 49 have no power. In FIGURE 5, lenses 47 and 48 operate with collimated light between them, and an image point on either side; in FIGURE 6, these same lenses operate with an image point between them and collimated light on either side. The image points at 42 and 55 in FIGURE 5, and at 43 in FIGURE 6, are really lines when viewed in perspective, these lines at 42 and 55 are vertical, and horizontal at 43.

The light emitted by source 44 in FIGURE 5 is focused by lens 46 onto ultrasonic cell 42. The light is then collimated by lens 47 so that it passes through cell 43, after which it is focused by lens 48 onto bar 55. Bar 55 is arranged so that the undiffracted light, as well as all diffracted light, except the first order on one side, is blocked. The single side order diffracted light passing bar 55 is finally focused by lens 49 onto screen 54. Lenses 45, 51, and 52 have no effect on the light in this view. In the elevation view, FIGURE 6, the light emitted by source 44 is collimated by lens 45 so that it passes through cell 42, after which it is focused by lens 47 onto ultrasonic cell 43. The light from cell 43 is collimated by lens 48, after which it is focused by lens 51 onto bar 56. As in FIGURE 5, only one side order spectrum is allowed to pass bar 56, the light permitted to pass is focused by lens 52 onto screen 54. The image on screen 54 is a point, since the light is focused in both planes.

Bar 55 is vertically oriented with respect to horizontal bar 56. Each bar blocks the undiffracted light in its respective plane. By simultaneously modulating cells 42 and 43 with appropriate signals, the spot of light may be positioned to any desired position on screen 54. By using a continuous laser as source 44, a large amount of light energy is available so that a brilliant image will appear on the screen 54, even with a large screen size and high-speed writing rates.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. A device for diffracting a beam of radiant energy through a selected angle, comprising:
    a body of liquid transparent to said radiant energy and located transversely of the path of said radiant energy;
    electro-acoustic means for propagating interacting acoustic energy waves of selected wavelength into said liquid body and at an amplitude sufficient to produce caviatation within said liquid body at a localized region the dimensions of which are substantially coextensive with the cross-sectional dimensions of said beam; and a source of frequency-modulated excitation signals connected to said electro-acoustic means for excitation thereof to produce an output of acoustic energy having a wavelength determined by the frequency of said excitation signals, said wavelength being inversely proportional to said selected angle.

2. A device for diffracting a beam of radiant energy through a selected angle, comprising:

a body of liquid transparent to said radiant energy and located transversely of the path of said radiant energy;

first and second transducer means spaced apart in mutual opposition across said liquid body for propagating acoustic energy of selected wavelength into said body in a direction transverse of said path, and at an amplitude sufficient to produce cavitation within said liquid body at a plurality of stationary regions; and a source of excitation signals connected in common to each of said transducer means for simultaneously exciting both of said transducer means to produce an output of acoustic energy at a level sufficient to induce cavitation in a portion of said liquid and at a wavelength determined by the frequency of said signals, said wavelength being inversely proportional to said selected angle.

3. A device as defined in claim 2 wherein said radiant energy is focused at a line normal to the direction of propagation of said radiant energy and passing through said liquid body, and wherein said first and second transducer means each comprise a directional electroacoustic transducer for directing said acoustic energy to the region of said line at which said radiant energy is focused.

4. A device as defined in claim 2 wherein said liquid body is confined within a container having two coplanar, spaced apart, transparent walls.

5. A device as defined in claim 2 wherein said liquid body comprises water to which has been added an agent to reduce surface tension and dispersed solid nuclei having diameters smaller than the wavelength of said radiant energy, to promote cavitation.

6. A device for diffracting a planar beam of light through a selected angle comprising:

an elongated body of transparent liquid having its major axis located transversely of said planar beam, said beam being focused along a line within said liquid body;

first and second directional electroacoustic transducers for generating and directing acoustic energy to a localized region coextensive with the light focus line; and a source of frequency-modulated signals connected in common to said transducers for exciting said transducers to produce said acoustic energy at an amplitude sufficient to cause cavitation within said liquid body at said localized region.

7. A device as defined in claim 6 wherein each of said transducers comprises an elongated piezoelectric crystal extending along the major axis of said body and having a concave acoustical energy propagating surface.

8. Radiant energy scanning apparatus comprising:

a source of light focused along a line;

a confined body of liquid, transparent to light from said source over a continuous portion thereof;

first and second means spaced apart and parallel to said continuous portion for propagating acoustical energy in a plane passing through said line; and frequency-modulated drive means connected to said energy propagating means for energizing said energy propagating means at a power level sufficient to cause cavitation within said body at a plurality of stationary regions where the acoustical energy from said energy propagating means meet, in said plane, spaced apart by one-half of the wavelength of the propagated acoustical energy.

9. Light scanning apparatus comprising:

a source of light;

first lens means for forming a planar beam of light from said source;

a body of transparent liquid located transversely of said beam, said beam being focused along a line within said liquid body;

electro-acoustic means for propagating acoustic energy of selected wavelength into said liquid body and at an amplitude sufficient to produce cavitation within said liquid body at a plurality of localized regions, surrounding said line, said regions of cavitation being effective to diffract the path of said beam through a selected angle;

a source of frequency-modulated excitation signals connected to said electro-acoustic means for excitation thereof to produce an output of acoustic energy having a wavelength determined by the frequency of said excitation signals, said wavelength being inversely proportional to said selected angle;

an elongate opaque bar member spaced apart from said liquid body and having its major axis substantially parallel with said line;

second lens means interposed between said liquid body and said bar member for directing said beam when undiffracted onto said bar;

a screen spaced apart from and substantially parallel to said bar member; and third lens means interposed between said bar member and said screen for directing said beam when diffracted onto said screen.

References Cited

UNITED STATES PATENTS

| | | | |
|---|---|---|---|
| 3,121,169 | 2/1964 | Benton | 350—179 X |
| 3,189,746 | 6/1965 | Slobodin et al. | 350—161 X |
| 3,306,977 | 2/1967 | Breuggemann | 178—7.6 |

JEWELL H. PEDERSEN, *Primary Examiner.*

E. S. BAUER, *Assistant Examiner.*